(12) United States Patent
Mays, Jr.

(10) Patent No.: US 6,853,812 B2
(45) Date of Patent: *Feb. 8, 2005

(54) POLARIZED-HOLOGRAPHIC FILTERING PROVIDING IMPROVED EXTINCTION RATIO

(76) Inventor: Robert Mays, Jr., 10707 Pinehurst Dr., Austin, TX (US) 78747

( * ) Notice: Subject to any disclaimer, the term of this patent is extended or adjusted under 35 U.S.C. 154(b) by 472 days.

This patent is subject to a terminal disclaimer.

(21) Appl. No.: 09/851,857

(22) Filed: May 9, 2001

(65) Prior Publication Data

US 2002/0167698 A1 Nov. 14, 2002

(51) Int. Cl.[7] .......................... H04B 10/10; H04B 10/18
(52) U.S. Cl. ...................... 398/130; 398/128; 398/129; 398/131; 359/15; 359/19; 359/29
(58) Field of Search ................................ 398/128, 129, 398/130, 131; 359/15, 29, 1, 19

(56) References Cited

U.S. PATENT DOCUMENTS

| | | |
|---|---|---|
| 3,610,926 A | 10/1971 | Kastner et al. |
| 3,751,132 A | 8/1973 | Croh |
| 3,785,736 A | 1/1974 | Spitz et al. |
| 3,885,856 A | 5/1975 | Ostrowsky et al. |
| 4,057,319 A * | 11/1977 | Ash et al. .................. 385/54 |
| 4,296,994 A | 10/1981 | Quick |
| 4,359,259 A * | 11/1982 | Horner et al. ............. 359/15 |
| 4,392,709 A * | 7/1983 | Horner et al. ............. 359/30 |
| 4,710,605 A | 12/1987 | Presby |
| 4,807,978 A | 2/1989 | Grinberg et al. |
| 4,817,207 A | 3/1989 | Smith et al. |
| 4,897,541 A | 1/1990 | Phillips |
| 4,932,989 A | 6/1990 | Presby |
| 4,953,954 A | 9/1990 | Ewbank et al. |
| 4,991,150 A | 2/1991 | Wixom |
| 5,008,890 A | 4/1991 | McFarlane |
| 5,011,254 A | 4/1991 | Edwards et al. |

(List continued on next page.)

FOREIGN PATENT DOCUMENTS

| | | |
|---|---|---|
| WO | WO 99/59766 | 11/1999 |
| WO | WO 99/60192 | 11/1999 |
| WO | WO 00/02700 | 1/2000 |
| WO | WO 00/04660 | 1/2000 |
| WO | WO 00/05026 | 2/2000 |
| WO | WO 00/32327 | 6/2000 |
| WO | WO 00/28359 | 10/2000 |

OTHER PUBLICATIONS

"United States Frequency Allocations–1996", http://www.autoid.org/documents/freqallochrt.pdf.*

Hariharan, P. *Optical Holography: Principles, Techniques and Applications.* Cabridge: Cambridge University Press, 2$^{nd}$ Edition, pp. 213–223, 1996.

Stewart, James E. *Optical Principals and Technology for Engineers.* New York: Marcel Dekkar, pp. 45–51 and 79–81, 1996.

U.S. Appl. No. 09/648,847, Mays, filed Aug. 25, 2000.
U.S. Appl. No. 09/884,424, Mays, filed Jun. 19, 2001.
U.S. Appl. No. 09/884,459, Mays, filed Jun. 19, 2001.
U.S. Appl. No. 09/884,562, Mays, filed Jun. 19, 2001.

*Primary Examiner*—Jason Chan
*Assistant Examiner*—Nathan Curs
(74) *Attorney, Agent, or Firm*—Law Office of Kenneth C. Brooks

(57) ABSTRACT

A filtering technique for free space communication that features an improved extinction ratio by providing a filter that employs a bulk holographic transform function and a polarizing film. In this manner, a greater number of channels of communication may be provided in a unit volume while preventing unwanted cross-talk between the communication channels. To that end, the system includes a source of energy to direct energy along a path, a detector disposed in the path, and a filter. The filter has a surface upon which a polarizing film is disposed and a holographic transform function recorded throughout a volume thereon.

20 Claims, 12 Drawing Sheets

U.S. PATENT DOCUMENTS

| | | | |
|---|---|---|---|
| 5,103,324 A | * | 4/1992 | Brandstetter .................... 359/9 |
| 5,140,657 A | | 8/1992 | Thylen |
| 5,245,623 A | | 9/1993 | McFarlane |
| 5,256,851 A | | 10/1993 | Presby |
| 5,325,386 A | | 6/1994 | Jewell et al. |
| 5,369,415 A | | 11/1994 | Richard et al. |
| 5,399,315 A | | 3/1995 | Paz-Pujalt et al. |
| 5,411,709 A | | 5/1995 | Furuki et al. |
| 5,442,433 A | * | 8/1995 | Hoshino et al. ............... 356/71 |
| 5,446,334 A | | 8/1995 | Gaffney |
| 5,446,572 A | | 8/1995 | Husbands et al. |
| 5,446,816 A | | 8/1995 | Shiraishi et al. |
| 5,467,104 A | | 11/1995 | Furness, III et al. |
| 5,515,194 A | | 5/1996 | Kanterakis et al. |
| 5,521,913 A | | 5/1996 | Gridley |
| 5,596,339 A | | 1/1997 | Furness, III et al. |
| 5,602,679 A | | 2/1997 | Dolgoff et al. |
| 5,622,868 A | | 4/1997 | Clarke et al. |
| 5,659,327 A | | 8/1997 | Furness, III et al. |
| 5,677,778 A | | 10/1997 | Kanterakis |
| 5,699,464 A | | 12/1997 | Marcuse et al. |
| 5,706,114 A | | 1/1998 | Erteza |
| 5,772,720 A | | 6/1998 | Taira-Griffin et al. |
| 5,793,919 A | | 8/1998 | Payne et al. |
| 5,809,198 A | | 9/1998 | Weber et al. |
| 5,832,147 A | | 11/1998 | Yeh et al. |
| 5,857,042 A | | 1/1999 | Robertson et al. |
| 5,886,822 A | | 3/1999 | Spitzer |
| 5,915,097 A | | 6/1999 | Chao |
| 5,935,288 A | | 8/1999 | DiGiovanni et al. |
| 5,943,149 A | | 8/1999 | Cearns et al. |
| 6,008,781 A | | 12/1999 | Furness, III et al. |
| 6,055,099 A | | 4/2000 | Webb |
| 6,072,579 A | | 6/2000 | Funato |
| 6,079,252 A | | 6/2000 | Tabler et al. |
| 6,081,430 A | | 6/2000 | La Rue |
| 6,083,767 A | | 7/2000 | Tjaden et al. |
| 6,144,472 A | | 11/2000 | Knox |
| 6,151,144 A | | 11/2000 | Knox |
| 6,185,215 B1 | | 2/2001 | Aho |
| 6,246,026 B1 | | 6/2001 | Vergeest |
| 6,246,680 B1 | | 6/2001 | Muller et al. |
| 6,284,546 B1 | | 9/2001 | Bryning et al. |
| 6,304,694 B1 | | 10/2001 | Ford |
| 6,314,210 B1 | | 11/2001 | Fukushima et al. |
| 6,449,066 B1 | | 9/2002 | Arns et al. |
| 6,486,984 B1 | * | 11/2002 | Baney et al. ............... 398/212 |
| 6,542,264 B1 | | 4/2003 | Agranat et al. |

* cited by examiner

POLARIZED-HOLOGRAPHIC FILTERING PROVIDING IMPROVED EXTINCTION RATIO

BACKGROUND OF THE INVENTION

The present invention relates to wireless, or free space, communication. Particularly, the present invention concerns channel discrimination techniques suited for wireless free space interconnects.

Reliance upon wireless technology is increasing as the need to increase computational efficiency becomes salient. Specifically, improved operational characteristics of data links employ advancements in wireless communication systems to replace conventional hardwired technology. A well-known example includes the replacement of conventional hardwired telephony with wireless cellular technology. This has generated a need for improvement methodologies that move away from traditional RF wireless technology to optical technology.

U.S. Pat. No. 4,057,319 to Ash et al. discloses an optical interconnect system in which individual connections are made involving the passage of light between a specific device in one array of optical devices and a specific device in another array of optical devices. This is achieved via a phase hologram plate of the transmission type fixed relative to each array.

U.S. Pat. No. 5,140,657 to Thylen discloses a device for optically coupling an optical fiber, forming part of an optical communication system, to an optical semiconductor laser amplifier. Specifically, the semiconductor laser amplifier has an input facet and an output facet, and the optical fiber has an end surface arranged opposite to at least one of the facets. A diffraction optics element is disposed between the end surface of the fiber and the surface of the facet in order to adapt the nearfield of the fiber end to the nearfield of the facet surface while filtering the same to reduce spontaneous emission noise. The diffraction optics element is described as being a phase hologram.

U.S. Pat. No. 6,072,579 to Funato discloses an optical pickup apparatus that includes first and second light sources that selectively emit one of first and second light beams, respectively. The first and second light beams are different in wavelength and are suitable for accessing first and second optical disks respectively. A coupling lens converts a corresponding one of the first and second light beams into a collimated beam. An objective lens forms a light spot on a corresponding one of the first and second optical disks by focusing the collimated beam. A holographic optical element receives a reflection beam of the light spot from one of the first and second optical disks and provides holographic effects on the reflection beam so as to diffract the reflection beam in predetermined directions of diffraction depending on the wavelength of the reflection beam. A photo detector receives the reflection beam from the holographic optical element at light receiving areas and outputs signals indicative of respective intensities of the received reflection beam at the light receiving areas, so that a focusing error signal and a tracking error signal are generated based on the signals. A drawback with the aforementioned optical interconnect systems is that each coupling device requires precise alignment of the optical elements to achieve efficient coupling of optical energy while avoiding cross-talk between adjacent channels.

What is needed, therefore, is an improved free space interconnect technique that reduces cross-talk between adjacent channels.

SUMMARY OF THE INVENTION

Provided is a communication system that features improved extinction ratio by providing a filter that employs a bulk holographic transform function and a polarizing film. In this manner, a greater number of channels of communication may be provided in a unit volume while preventing unwanted cross-talk between the communication channels. To that end, the system includes a source to direct energy along a path, a detector disposed in the path, and a filter. The filter has a surface upon which a polarizing film is disposed and a holographic transform function is recorded throughout a volume thereon.

BRIEF DESCRIPTION OF THE DRAWINGS

FIG. 13 is a perspective view of the wavelength properties associated with the optical energy from which the interference pattern formed by the apparatus shown in FIG. 9;

FIG. 14 is a perspective view of a holographic transform formed from the recording of the properties shown above with respect to FIGS. 11–13 recorded in a subportion of a photo-sensitive sheet shown in FIG. 9;

FIG. 15 is a perspective view of a compound holographic transformed from the recording of two holographic transforms in a sub-portion of a photo-sensitive sheet shown above in FIG. 9;

DETAILED DESCRIPTION OF THE INVENTION

Figure 1:
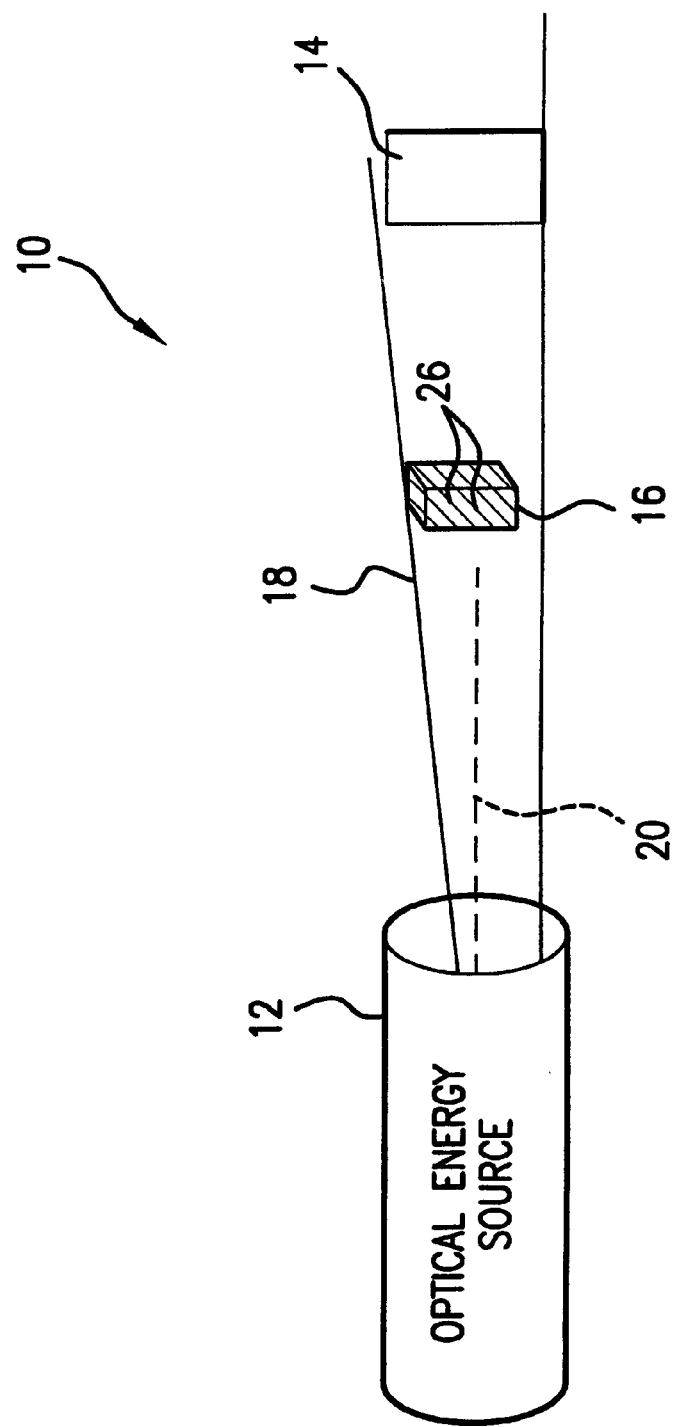
FIG. 1 is a simplified plan view of a communication system in accordance with one embodiment of the present invention.

Referring to FIG. 1, shown is a communication system 10 including a source of optical energy 12, an optical detector 14 in data communication with the source of optical energy 12, with an filtering apparatus 16 disposed therebetween. The source 12 directs optical energy 18 along a path 20 in which the optical detector 14 lies. The filtering apparatus 16 is disposed between the source 12 and the optical detector 14 and filters optical energy propagating therethrough. In this manner, filtering apparatus 16 removes from unwanted characteristics from the optical energy impinging upon optical detector 14.

The unwanted characteristics that may be removed from the optical energy 18 includes amplitude wavelength and/or polarization information. To that end, filtering apparatus 16 has a bulk hologram recorded therein that defines a transform function, shown graphically as periodic lines 26 for simplicity. The transform function 26 facilitates characterizing optical energy 18 to have desired characteristics that may improve detection of information contained in the optical energy 18, by the optical detector 14. Specifically, optical energy 18 may function as a carrier wave and be modulated with information. Filtering is achieved by the transform function selectively allowing specified characteristics of the carrier, e.g., optical energy 18, to pass therethrough and impinge upon optical detector 14.

Figure 2:
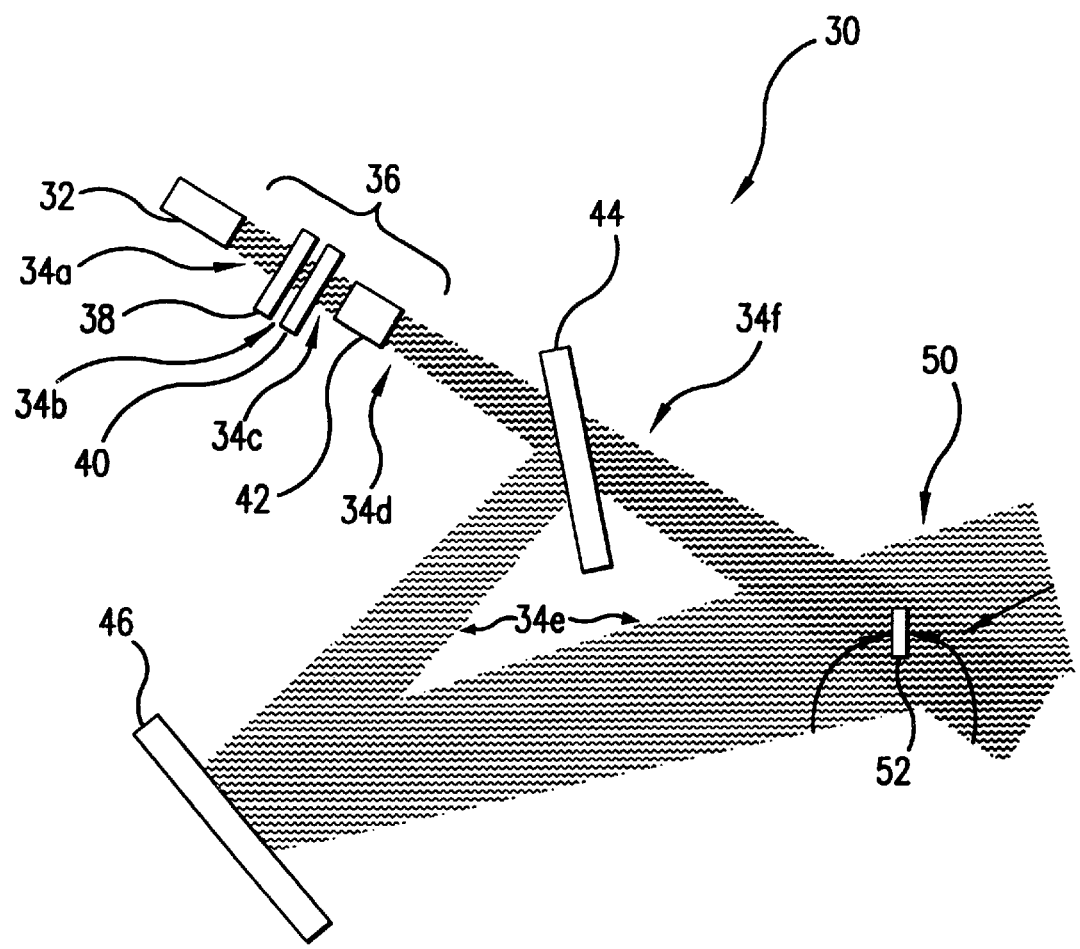
FIG. 2 is a simplified plan view showing an apparatus for fabricating the filter apparatus shown above in FIG. 1, in accordance with one embodiment of the present invention.

Referring to both FIGS. 1 and 2, transform function 26 is recorded as a periodic arrangement of the space-charge field of the material from which filtering apparatus 16 is fabricated. The transform function 26 is recorded employing a system 30 that includes a beam source 32 that directs a beam 34a into wave manipulation optics 36, such as a ¼ waveplate 38, so that a beam 34b is circularly polarized. Beam 34b impinges upon polarizer 40 so that a beam 34c propagating therethrough is linearly polarized. Beam 34c impinges upon a Faraday rotator 42 that changes birefringence properties to selectively filter unwanted polarizations from beam 34c. In this manner, a beam 34d egressing from the rotator 42 is linearly polarized. Beam 34d impinges upon a beam splitter 44 that directs a first subportion 34e of beam 34d onto a planar mirror 46. A second subportion 34f of beam 34d passes through splitter 44. The first and second subportions 34e and 34f intersect at region 50 forming an optical interference pattern that is unique in both time and space. The material from which filtering apparatus 16 is formed, photosensitive sheet 52, is disposed in the region so as to be exposed to the optical interference pattern. The interference pattern permeates the photosensitive sheet 52 and modulates the refractive index and charge distribution throughout the volume thereof. To that end, sheet 52 may be formed from any suitable photo-responsive material, such as silver halide or other photopolymers. Other materials from which sheet 52 may be formed include $LiNbO_3$, $LiTaO_3$, $BaTiO_3$, $KnbO_3$, $Bil_2SiO_{20}$, $Bi_{12}GeO_{20}$, $PbZrO_3$, $PbTiO_3$, $LaZrO_3$, or $LaTiO_3$.

Figure 3:
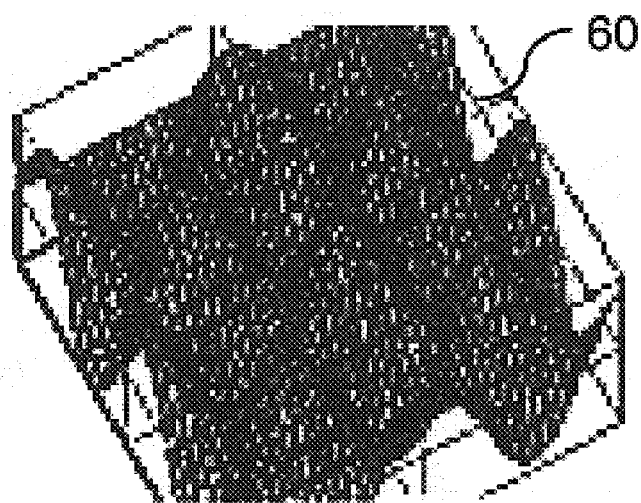
FIG. 3 is a perspective view of a subportion of a volume of the filter apparatus discussed above in FIGS. 1 and 2 showing a holographic transform function recorded therein.
Figure 4:
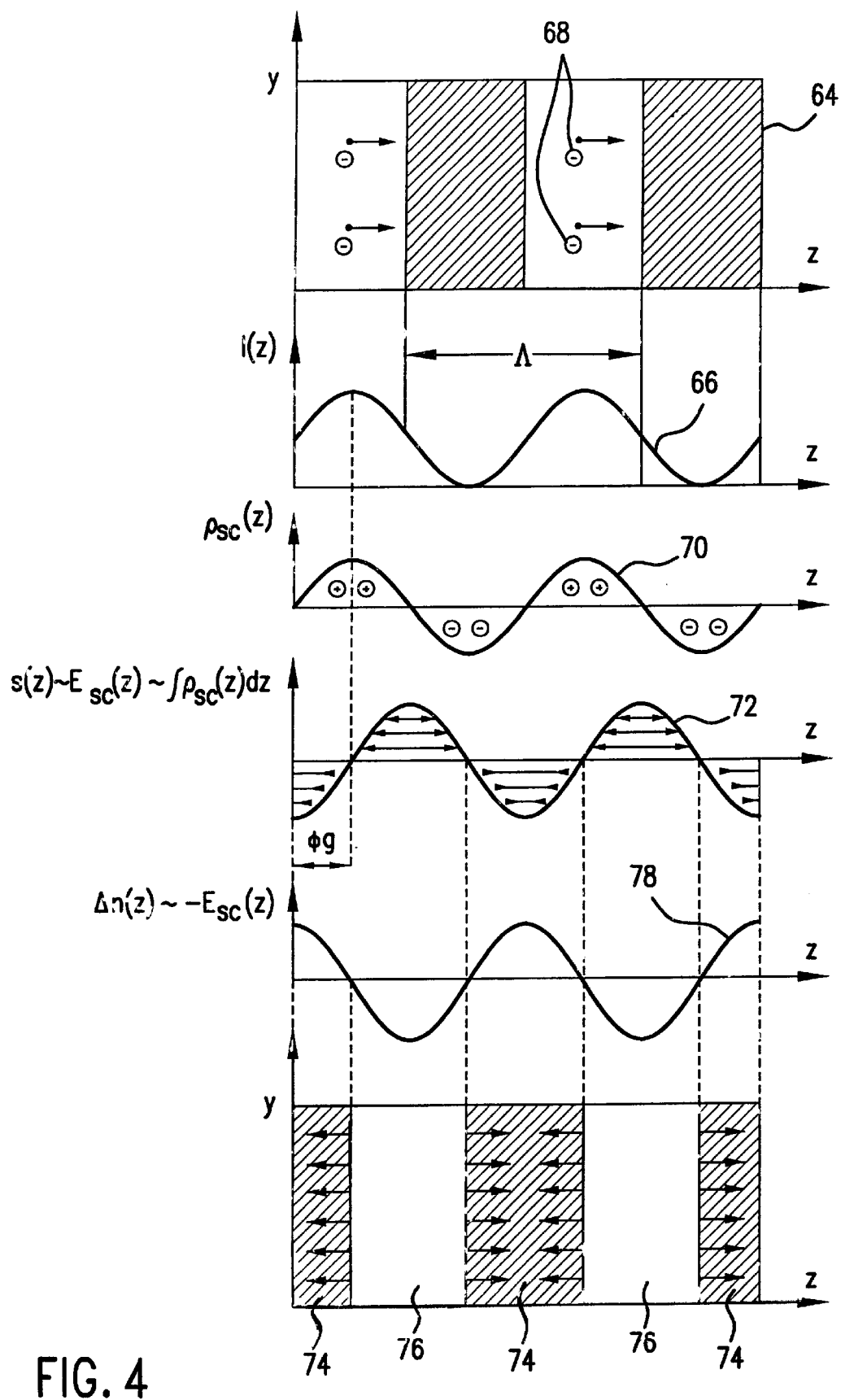
FIG. 4 is a graphical representation showing charge distribution changes in the volume discussed above with respect to FIG. 3, in relation to the optical energy impinging thereupon and the resulting strain in the material of the volume.
Figure 5:
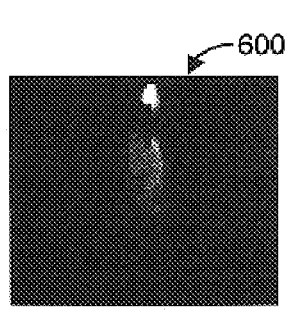
FIG. 5 is a perspective view demonstrating a first subportion of a bulk holographic transform function discussed showing a portion of the characteristics of optical energy impinging upon the volume discussed above with respect to FIG. 3.
Figure 6:
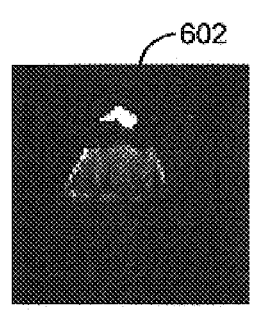
FIG. 6 is a perspective view demonstrating a second subportion of a bulk holographic transform function discussed showing a portion of the characteristics of optical energy impinging upon the volume discussed above with respect to FIG. 3.
Figure 7:
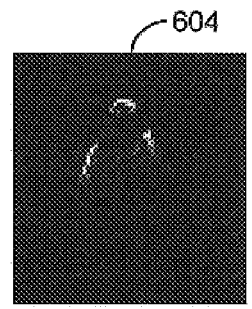
FIG. 7 is a perspective view demonstrating a third subportion of a bulk holographic transform function discussed showing a portion of the characteristics of optical energy impinging upon the volume discussed above with respect to FIG. 3.
Figure 8:
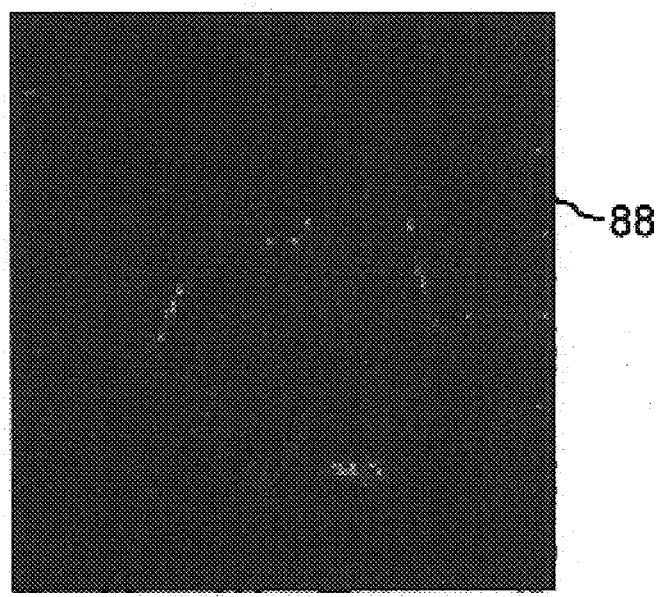
FIG. 8 is a perspective view demonstrating the resulting bulk holographic transform function recorded in a volume of material from the combined characteristics shown above in FIGS. 5–7.

Referring to FIGS. 2, 3 and 4, the modulation that is induced throughout the volume of the photosensitive sheet 52 is in accordance with the modulation properties of the first and second subportions 34e and 34f. A subportion of the aforementioned volume is shown as 60. A cross-section of volume 60 is shown as 64. An interference pattern, shown for simplicity as 66, is produced by beams 34f and 34e. Interference pattern 66 induces changes in refractive indices of volume 64 based on the spatial modulation of photo-currents that results from non-uniform illumination. Charges such as electrons 68, or holes, migrate within volume 64 due to diffusion and/or drift in an electric field present therein, referred to as photo-excited charges. The generation of photocurrents at low beam intensity depends on the presence of suitable donors. The photo-excited charges, which are excited from the impurity centers by interference pattern 66, are re-trapped at other locations within volume 64. This produces positive and negative charges of ionized trap centers that are re-excited and re-trapped until finally drifting out of the region of volume 64 upon which the interference pattern 66 impinges. This produces a charge distribution within volume 64, shown by curve 70. Charge distribution 70 creates a strain through volume 64, shown by curve 72 that produces regions of negative charge concentration 74 and regions of positive charge concentration 76. The resulting space-charge field between the ionized donor centers and the trapped photo-excited charges modulates the refractive indices, which is shown graphically by curve 78.

Referring to FIGS. 2 and 4–8, shown are exemplary data associated with the interference pattern generated by the superposition of the first and second sub-portions 34e and 34f. Datum 80 shows one of the dimensions recorded in sheet 52. Specifically, datum 80 is a three-dimensional representation of the amplitude components of the interference pattern. Datum 82 is phase components associated with the interference pattern. Datum 84 is the wavelength components associated with the interference pattern.

Recorded in a sub-portion of sheet 52, data 80, 82 and 84 define a hologram 88 that is defined throughout the entire bulk or volumetric thickness, $v_\delta$, measured between opposing sides of volume 64. The volumetric thickness, $v_\delta$, is defined to be the thickness required to record a complete holographic transform function. It has been determined that, for a given material, the volumetric thickness, $v_\delta$, is inversely proportion to the wavelengths of first and second sub-portions 34e and 34f that create the interference pattern. A volumetric thickness, $v_\delta$, as little as several microns was found suitable for recordation of a single holographic transform in the near-infrared optical frequencies. With the appropriate volumetric thickness, $v_\delta$, all of the physical properties associated with the photonic or electromagnetic waves of the interference pattern, e.g., spatial and temporal (phase) aspects, wavelength, amplitude, polarization, etc. are stored in volume 64. Holographic transform 88 functions as a gateway to provide real-time and near real-time optical filtering and encoding.

Figure 9:
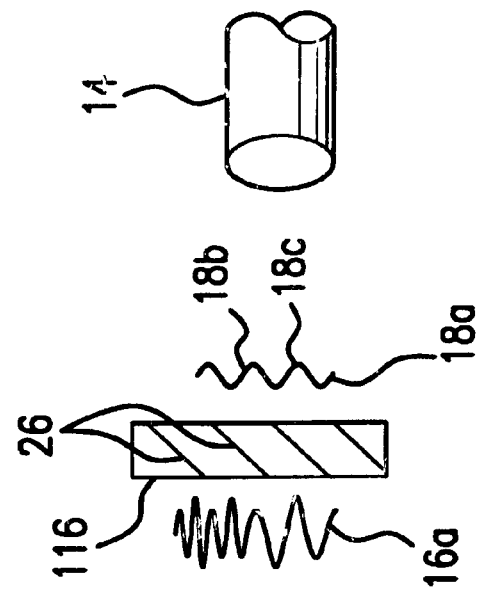
FIG. 9 is a simplified plan view showing encoding and decoding of optical energy in accordance with the present invention.
Figure 9:
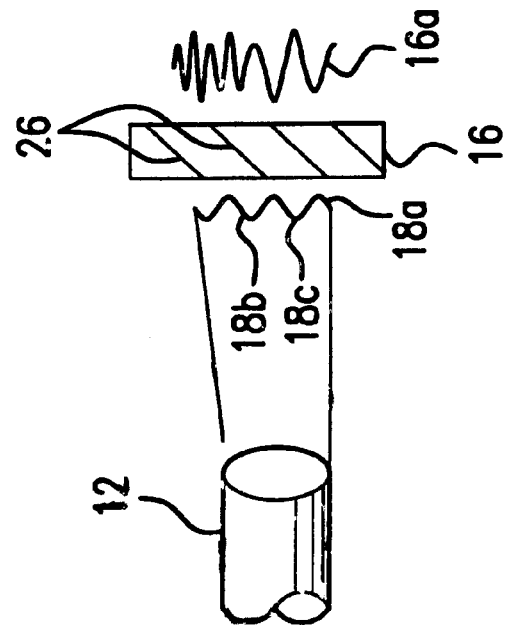

Referring to FIG. 9, a wavefront 18a is emitted by optical energy source 12 having a signal modulated thereon, shown as curves 18b and 18c. After propagating through filtering apparatus 16, transform function 26 operates on wavefront 18a to rearrange the electromagnetic fields associated therewith, thereby encoding the same. Encoded wavefront 16a includes the modulation 18b and 18c. However, in order to perceive the information associated with the modulation, the encoded wavefront 16a should be decoded. This requires propagating encoded signal 16a through a transform function that is substantially identical to transform function 26. To that end, an additional filtering apparatus 116 having the same transform function 26 recorded therein should be placed between a detector 14 and encoded wavefront 16a. Upon propagating through filtering apparatus 116 encoded wavefront 16a is unencoded, thereby rendering unencoded wavefront 18a and all the information contained in modulation 18b and 18c. Thus, it is seen that the inverse transform of the transform function 26 is the transform function 26 itself. Thus, propagating a wavefront through an even multiple of a single transform function, the original wavefront may be maintained. Conversely, propagating wavefront through an uneven multiple of a single transform function results in an encoded wavefront, which is virtually impossible to detect, much less demodulate, without unencoding the same. In this manner, superior beam-sensor discrimination may be achieved.

Figure 10A:
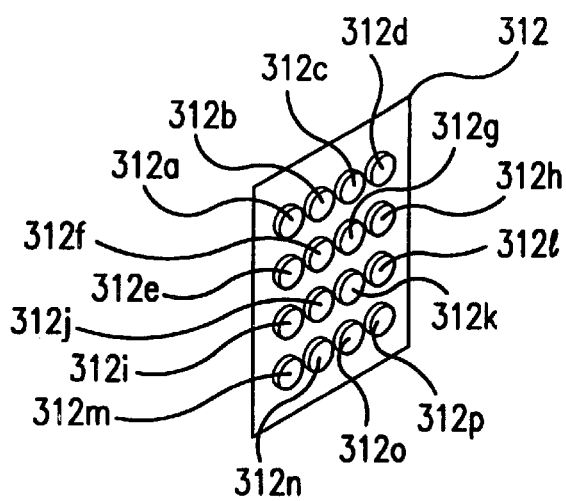
FIG. 10 is perspective view of the communication system shown above in FIG. 1, in accordance with an alternate embodiment.
Figure 10B:
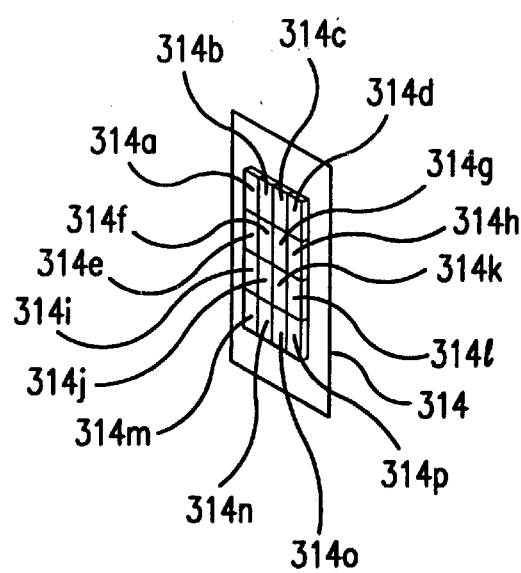

Referring to FIG. 10, beam-sensor discrimination provided by the present invention is beneficial to a multi-channel optical communication system 310. One example of optical communication system 310 includes an array 312 of optical transmitters, shown generally as 312a–312p, and an array 314 of optical detectors, shown generally as 314a–314p. The optical transmitters 312a–312p generate optical energy to propagate along a plurality of axes, and the optical receivers 314a–314p are positioned to sense optical energy propagating along one of the plurality of optical axes. Specifically, the array 312 is an (X×Y) array of semiconductor lasers that produce a beam that may be modulated to contain information. The array 314 may comprise of virtually any optical detector known, such as a charged coupled devices (CCD) or charge injection detectors (CID). In the present example, the array 314 comprises of CIDs arranged in an (M×N) array of discrete elements. The optical beam from the each of the individual emitters 312a–312p may expand to impinge upon each of the detectors 314a–314p of the array 314 if desired. Alternatively, the optical beam from each of the individual emitters 312a–312p may be focused to impinge upon any subportion of the detectors 314a–314p of the array 314, discussed more fully below. In this fashion, a beam sensed by one of the detectors 314a–314p of the array 314 may differ from the beam sensed upon the remaining detectors 314a–314p of the array 314. To control the wavefront of the optical energy produced by the transmitters 312a–312p, the filtering apparatus 16, discussed above with respect to FIGS. 1–8 may be employed as an array of the filtering apparatuses 416, shown more clearly in FIG. 11 as array 400.

Figure 11:
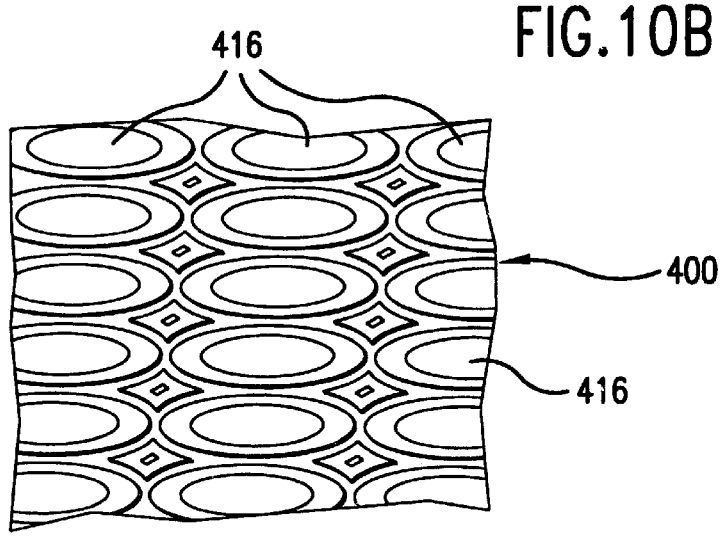
FIG. 11 is perspective view of an array of the filters fabricated on a photo-sheet shown above in FIG. 10.
Figure 12:
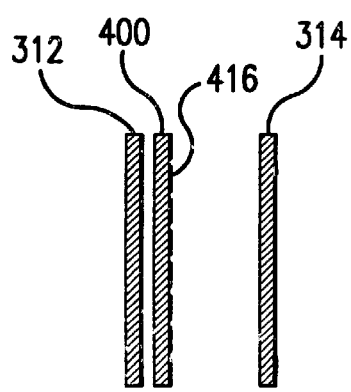
FIG. 12 is a cross-sectional plan view of the optical communication system shown above in FIG. 10, in accordance with the present invention.
Figure 13:
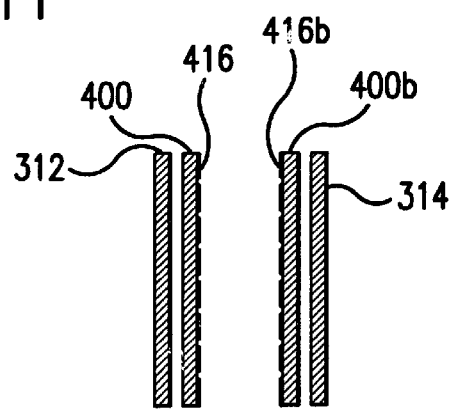
FIG. 13 is a cross-sectional plan view of the optical communication system shown above in FIG. 12, in accordance with an alternate embodiment of the present invention.

Specifically, referring to FIGS. 11 and 13, the individual filtering apparatuses 416 of the array are arranged to be at the same pitch and sizing of the array 312. The numerical aperture of each of the filtering apparatuses 416 of the array 400 is of sufficient size to collect substantially all of the optical energy produced by the transmitters 312a–312p corresponding thereto. In one example, the array 400 is attached to the array 312 with each lens resting adjacent to one of the transmitters 312a–312p. To provide the necessary functions, each of filtering apparatuses 416 of the array 400 may be fabricated to include the features mentioned above in FIGS. 1–8. As a result, each of the filtering apparatuses 416b of the array may be formed to having functional characteristics that differ from the remaining filtering apparatuses 416 of the array. In this manner, each beam produced by the array 312 may be provided with unique properties, such as wavelength, amplitude and polarization. This facilitates reducing crosstalk and improving signal-to-noise ratio in the optical communication system 310.

Specifically, the filtering apparatus 316 may include an additional array 400b of filtering apparatuses 416b that match the pitch of the individual detectors 314a–314p of the array 314, shown more clearly in FIG. 13. The filtering apparatuses 416b may be fabricated to provide the same features as discussed above with respect to array 400, shown in FIG. 10.

Referring to FIGS. 10, 11 and 13 each of the transmitters 312a–312p of the array 312 would then be uniquely associated to communicate with only one of the detectors 314a–314p of the array 314. In this manner, the transmitter 312a–312p of the array 312 that is in data communication with one of the one of the detectors 314a–314p of the array 314 would differ from the transmitters 312a–312p in data communication with remaining detectors 314a–314p of the array 314, forming a transmitter/detector pair that is in optical communication. Communication between the transmitter detector pair is achieved by having the properties of the filtering apparatuses 416 in array 400 associated with the transmitter match the properties of the filtering apparatuses 416b in array 400b associated with the detector. For example were the filtering apparatuses 416 associated with transmitter 312a to match the properties of filtering apparatuses 416b associated with detector 314c, the optical energy produced by transmitter 312a could be sensed by detector 314c. Assume no other detector has filtering apparatuses 416b associated therewith that have properties matching the properties of the filtering apparatuses 416 associated with transmitter 312a. Then detector 314c would be the only detector of array 314 capable of sensing optical energy from transmitter 312a. This results from the inherent properties of holographic transforms, discussed more fully below. It should be seen that in addition to filtering, the holographic transform provides security against unauthorized sensing of optical energy. In this manner, information modulated on the optical energy produced by transmitter 312a may only be perceived by detector 314c. This is also discussed more fully below.

It should be understood, however that one of the transmitters 312a–312p might be in data communication with any number of the detectors 314a–314p by multiple filtering apparatuses 416b matching the properties of one of the filtering apparatuses 416. Similarly, one of the multiple transmitters 312a–312p may be in optical communication with one or more of the detectors 314a–314p by appropriately matching the filtering apparatuses 416 to the filtering apparatuses 416b.

In one example, superior performance was found by having the array 314 sectioned into (m×n) bins, with each bin corresponding to a particular polarization and/or wavelength that matched a particular polarization and/or wavelength corresponding to a transmitter 312a–312p. Thus, were a beam from one or more of the transmitters 312a–312p to flood the entire (M×N) array 314 or multiple (m×n) bins, only the appropriate detectors 314a–314p sense information with a very high signal-to-noise ratio and discrimination capability.

Additional beam-sensor discrimination may be achieved by employing transmitters 312a–312p having different wavelengths or by incorporating up-conversion processes that include optical coatings applied to the individual transmitters 312a–312p or made integral therewith. One such up-conversion process is described by F. E. Auzel in "Materials and Devices Using Double-Pumped Phosphors With Energy Transfer", Proc. of IEEE, vol. 61. no. 6, June 1973. In addition, coating one or more filtering apparatuses 416 of array 400 with a polarizing film provides further discrimination using polarizing discrimination. The combined effect of the transform function and the polarizing improves the extinction ratio of either the transform function or the polarizing film by one order of magnitude or better. For example, a typical polarizing film providing an extinction ratio of 50 to 100 may be increased to 1,000, or better, when employed in conjunction with the transform function in accordance with the present invention. Similar improvements in the extinction ratio of a transform function is realized with this combination. To that end, the polarizing orientation of the film should match the polarizing orientation provided by the transform function.

Referring to both FIGS. 2 and 13, filtering apparatuses 416 and 416b, with differing transform functions are formed on differing photosensitive sheets 52. Specifically, the transform function is defined by the interference pattern formed by the first and second subportions 34e and 34f intersecting at region 50. This interference pattern is unique in both time and space. As a result, each of the filtering apparatuses formed on the sheet 52 would have substantially identical holographic transform functions. To create filter apparatuses with differing transform functions, an additional photosensitive sheet 52 would be employed. Considering that the interference pattern is unique in both time and space, a subsequent sheet 52 disposed in region 50 would have a differing transform function recorded therein thereon than the transform function recorded on a sheet 52 at an earlier time. This is due, in part, to the time-varying fluctuations in the operational characteristics of the various components of system 30. As a result multiple sheets 52 are formed, each of which has a transform function associated therewith that differs from the transform function associated with the remaining sheets. After forming the aforementioned multiple sheets, the filtering apparatuses on each of the sheets is segmented so that the same may be arranged proximate to one or more emitters and one or more detectors, as desired.

Alternatively, or in addition, the Faraday rotator 42 may be rotated to provide the lenses formed on the photosensitive sheet 52 with a holographic transform function that differs from the transform function associated with the lenses formed on a previous photosensitive sheet 52.

Referring to FIG. 13, it should be noted that the array 312 may comprise a single emitter 412 that produces sufficient beam width to impinge upon all of filtering apparatuses 416 of array 400. In this manner, the array 400 of filtering apparatuses 416 is employed in the aggregate to increase both the numerical aperture and enhance the signal to noise ratio, as well as to provide a multi-transform operation across the cross-section of the optical energy produced by single emitter 412. Employing the multi-transform operation over the cross-sectional area of the optical energy takes advantage of the properties of the holographic transforms recorded in each filtering apparatuses 416. Specifically, the holographic transforms in each of the filtering apparatuses function in the aggregate to operate on the wavefront of the optical energy as an aggregate holographic transform to vary the wavefront, defining an encoded wavefront. The encoded wavefront may be returned to the un-encoded state, i.e., decoded, by having the same propagate through a matching aggregate holographic transform. To that end, the array of detectors 314 may comprise of a single detector to facilitate unencoding of the optical energy. This makes the present invention suitable for use with free space interconnects over local area networks, wide area networks and metropolitan area networks, because multiple networks may communicate through a common volume of space without corrupting the data associated with the network.

Figure 14:
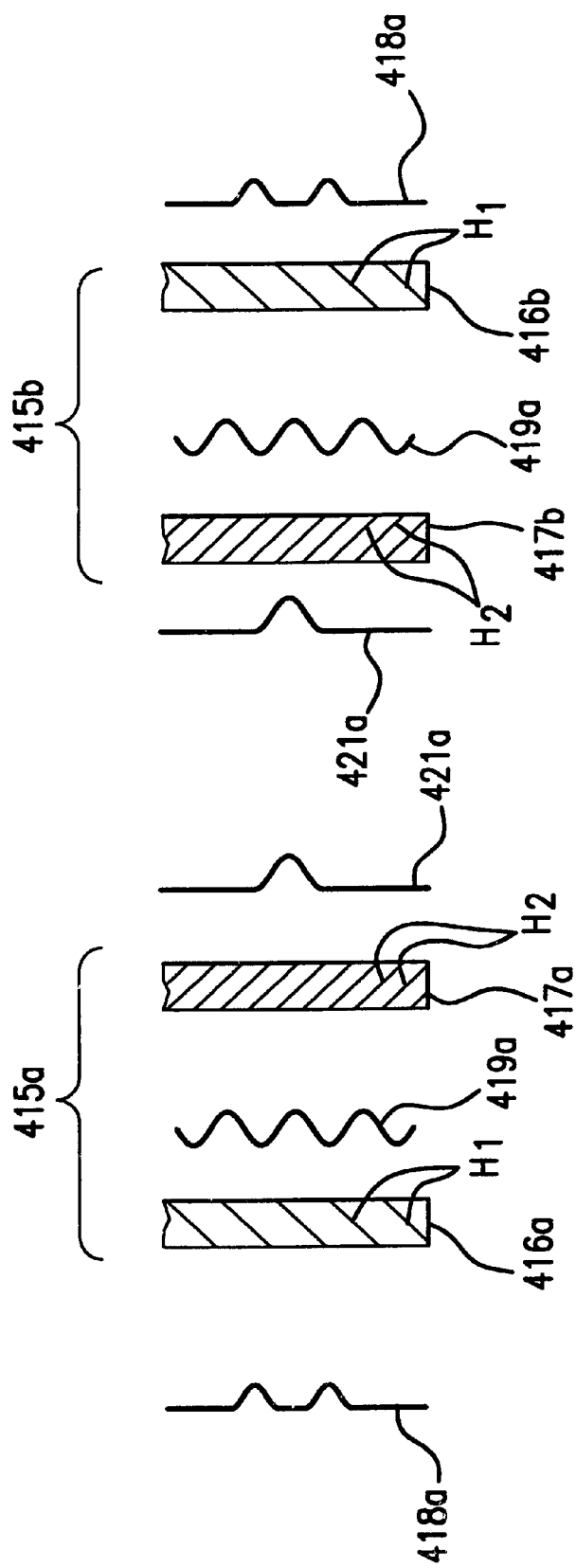
FIG. 14 is a simplified plan view showing sequential encoding and decoding of optical energy in accordance with the present invention.

Referring to FIG. 14, another property of the transform function concerns sequential encoding and decoding. As mentioned above, the inverse transform function of a holographic transform function is the function itself. As a result, multiple encoding may be facilitated to provide increased beam-sensor discrimination. Specifically, assuming an optical encoding system 415 comprising a first filtering apparatus including 416a having a first transform function $H_1$ and a second filtering apparatus 417a including a second transform function $H_2$. Propagating wavefront 418a through first filtering apparatus including 416a would result in encoded wavefront 419a. Propagating encoded wavefront 419a through second filtering apparatus 417a would further encode wavefront 419a, yielding encoded wavefront 421a. To decode wavefront 421a to yield unencoded wavefront 418a requires first passing wavefront 421a through the second transform function to yield wavefront 419a. Thereafter, wavefront 419a would propagate through the first transform function to yield unencoded wavefront 418a. To that end, a decoding system 415b includes a third and fourth apparatus 417b and 416b, respectively. Third filtering apparatus 417b has a transform function associated therewith that is identical to transform function $H_2$. Fourth filtering apparatus 416b has a transform function associated therewith that is identical to transform function $H_1$. To decode wavefront 421a, third filtering apparatus 417b is positioned between second filtering apparatus 417a and fourth filtering apparatus 416b. In this manner, wavefront 421a first propagates through third filtering apparatus 417b to be decoded by transform function $H_2$ forming wavefront 419a. Wavefront 419a then propagates through filtering apparatus 416b to be decoded by transform function $H_1$, thereby yielding wavefront 418a. Wavefront 418a may then be sensed by a detector (not shown) to retrieve information contained therein.

Reversing the order of unencoding so that the first transform operated on wavefront 421a would yield unintelligible information, thereby preventing any information modulated on wavefront 418a being unencoded.

Figure 15:
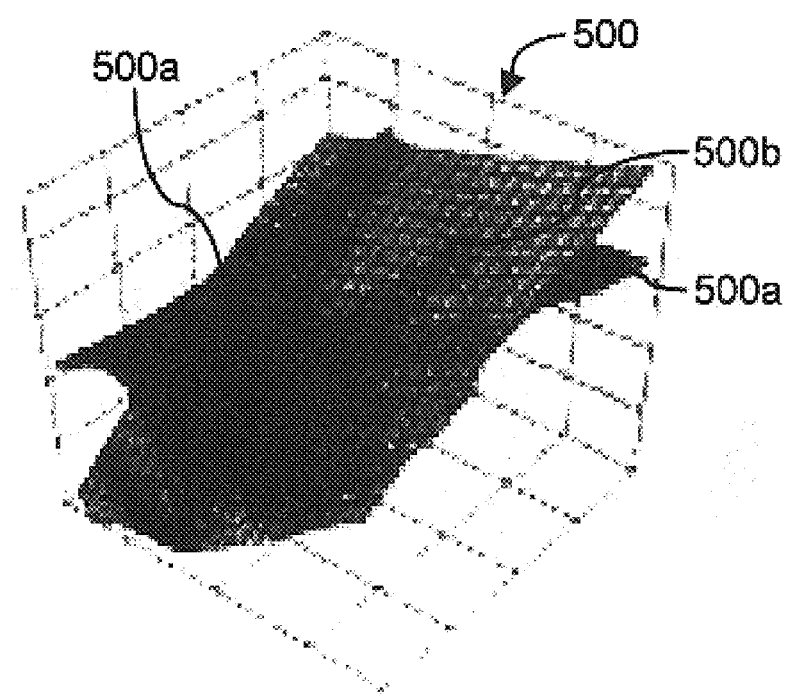
FIG. 15 is a perspective view of a compound holographic transform function in accordance with the present invention that may be employed as the filter discussed above with respect to FIG. 1.

Referring to FIG. 15, a property recognized with respect to the holographic transform functions is that two holographic transform function may be recorded in the an identical volume without interfering with each other. As a result a compound holographic transform function 500 may be recorded in which two or more independent holographic transform functions are recorded across a unit volume. Compound holographic transform function 500 is shown having two holographic transform functions 500a and 500b recorded therein. It was determined, however, that the volumetric thickness, $v_\delta$, was also defined by the number of holographic transforms recorded in a unit volume formed in a volume. Specifically, it is found that were recording and retrieval of multiple and independent holographic transforms, e.g., numbering in the hundreds and thousands, desired, then several millimeters of volumetric thickness, $v_\delta$, would be required.

Figure 16:
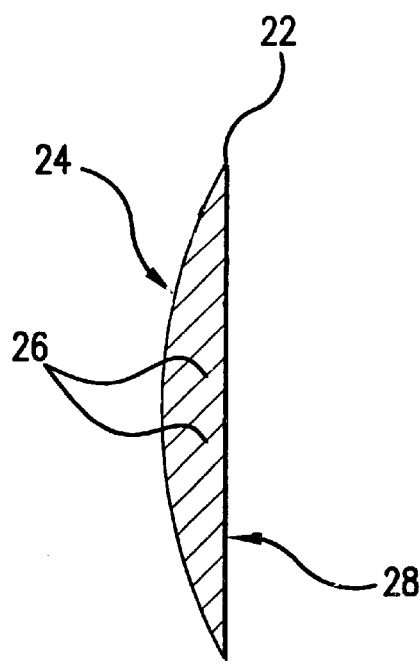
FIG. 16 is a cross-sectional view of a filter employed in the communication system shown above in FIG. 1, in accordance with an alternate embodiment of the present invention.
Figure 17:
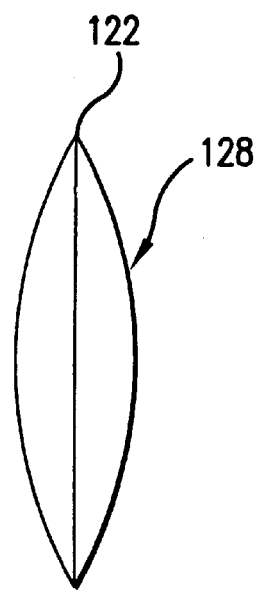
FIG. 17 is a cross-sectional view of the filter employed in the communication system shown above in FIG. 1, in accordance with a second alternate embodiment of the present invention.

Referring to FIGS. 2 and 16, to relax the alignment tolerance between optical energy source 12 and detector 14, filtering apparatus 16 may be provided with a lensing function. In this manner, filtering apparatus 16 may concurrently refract and filter optical energy 18. In this manner, filtering apparatus 16 defines a lens 22 having a bulk holographic transform function 26 recorded in substantially the entire volume thereof, through which optical energy will propagate. In this manner, the lens 22 and the bulk holographic transform function 26 are integrally formed in a manner described more fully below. Although the surface 28 of the lens 22 disposed opposite to the spherical arcuate surface 24 is shown as being planar, the surface 28 may also be arcuate as shown in surface 128 of lens 122 in FIG. 17.

The refractory function of the filtering apparatus 16 facilitates impingement of the optical energy 18 onto the optical detector 14. In this manner, the precise alignment of the optical detector 14 with respect to the source 12 and, therefore, the path 20 may be relaxed.

Figure 18:
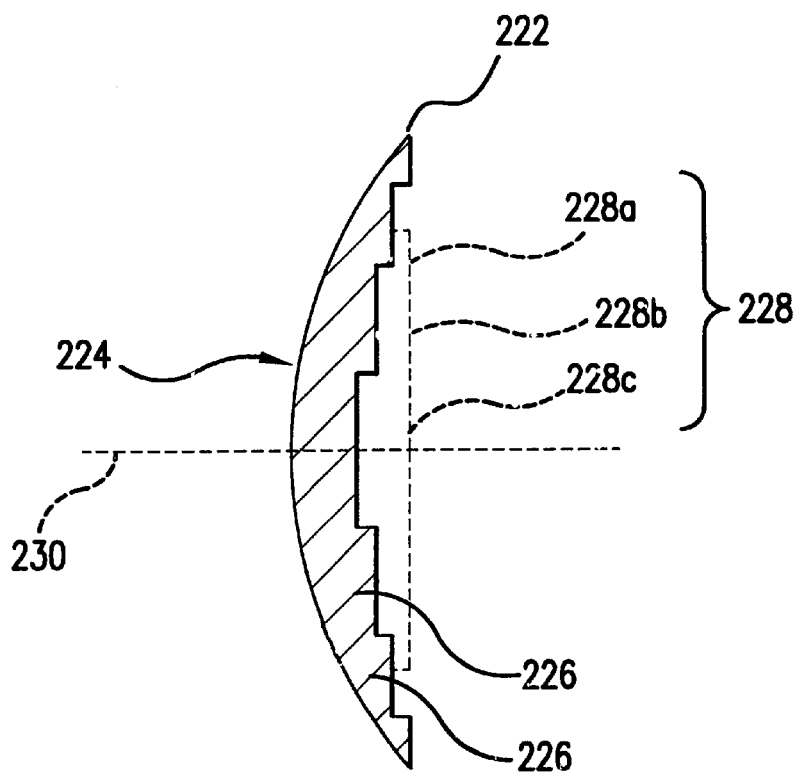
FIG. 18 is a cross-sectional view of the filter employed in the communication system shown above in FIG. 1, in accordance with a third alternate embodiment of the present invention.

Referring to both FIGS. 2 and 18, were it desired to further control the shape of optical energy propagating through lens 22, a lens 222 may be formed with a Fresnel lens 228 disposed opposite to the spherical surface 224. In this manner, substantially all of the optical energy propagating through lens 222 may be focused to differing points, depending upon the wavelength of optical energy propagating therethrough. To that end, the Fresnel lens 228 includes a plurality of concentric grooves, shown as recesses 228a 228b and 228c that are radially symmetrically disposed about a common axis 230. Thus, lens 222 may have three optical functions integrally formed in a common element, when providing the bulk holographic transform function 226 therein.

Figure 19:
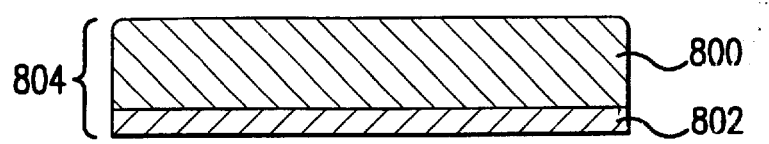
FIG. 19 is a cross-sectional view of a substrate on which the filter discussed above with respect to FIGS. 1 and 16–18 is fabricated.
Figure 20:
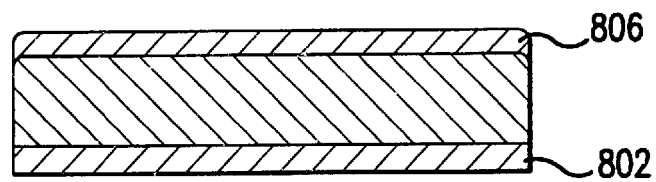
FIG. 20 is a cross-sectional view of the substrate, shown above in FIG. 19, undergoing processing showing a photo-resist layer disposed thereon.

To provide the aforementioned lensing function, the manufacturing process of photosensitive sheet 52 may include providing a photosensitive layer 800 adhered to a sacrificial support 802, shown in FIG. 19. Examples of sacrificial layers include glass, plastic and the like. The photosensitive layer 800 and sacrificial support 802 form a photosensitive substrate 804. Typically, photosensitive layer 800 is tens of microns thick. As shown in FIG. 20, a photo resist layer 806 is deposited onto the photosensitive layer 800 and then is patterned to leave predetermined areas exposed, shown as 808 in FIG. 21, defining a patterned substrate 810. Located between exposed areas 808 are photo resist islands 812. Patterned substrate 810 is exposed to a light source, such as ultraviolet light. This ultraviolet light darkens the volume of photo resist layer 800 that is coextensive with exposed areas 808 being darkened, i.e., become opaque to optical energy. The volume of photosensitive layer 800 that are coextensive with photo resist islands 812 are not darkened by the ultraviolet light, i.e., remaining transparent to optical energy. Thereafter, photo resist islands 812 are removed using standard etch techniques, leaving etched substrate 814, shown in FIG. 22.

Figure 22:
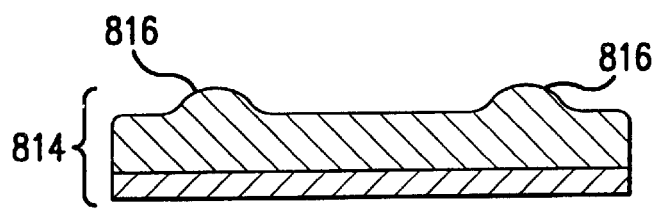
FIG. 22 is a cross-sectional view of the substrate, shown above in FIG. 21, undergoing processing after a first etch step.
Figure 23:
FIG. 23 is a cross-sectional view of the substrate, shown above in FIG. 22, undergoing processing after a second etch step.

Etched substrate 814 has two arcuate regions 816 that are located in areas of the photosensitive layer 800 disposed adjacent to islands 812, shown in FIG. 23. Arcuate regions 816 of FIG. 22 result from the difference in exposure time to the etch process of the differing regions of photosensitive layer 800.

Referring to FIGS. 2, 11 and 22, a subsequent etch process is performed to form array 400. During this etch process the support is removed as well as nearly 50% of photosensitive layer 800 to form a very thin array. Array 400 is then placed in the apparatus 30 and the bulk holographic transform functions are recorded in the arcuate regions 816 that define the lenses, as discussed above. The Fresnel lens may also be formed on the lenses of the array 400 using conventional semiconductor techniques. Thereafter, the lenses may be segmented from the photo resistive sheet or M×N sub-arrays of lenses may be segmented therefrom.

Although the invention has been described in terms of specific embodiments, one skilled in the art will recognize that various changes to the invention may be performed, and are meant to be included herein. For example, in additional to the optical communication discussed above, the present invention may be employed for RF communication using wavelengths in the range of one micron to one millimeters, inclusive.

In addition, instead of a transmissive filtering apparatus 16, a reflective filtering apparatus may be employed. The present invention would be suited for use on storage media such as compact diskettes that store various information, e.g., audio content, video content, audio-visual content and the like. In this manner, a signal, either optical or RF, would propagate into the filtering apparatus and be reflected back from the filtering apparatus through a common surface.

Figure 21:
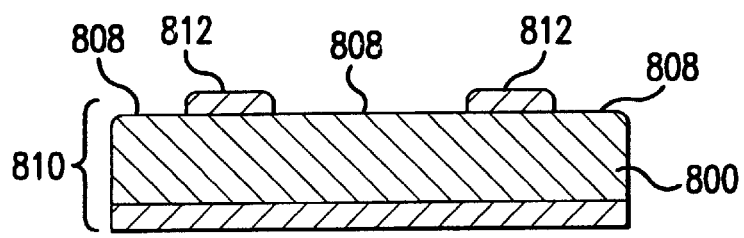
FIG. 21 is a cross-sectional view of the substrate, shown above in FIG. 20, undergoing processing showing a photo-resist layer being patterned.

Further, instead of forming the arcuate regions 816 using standard etch techniques, the same may be formed by exposing substrate 810, shown in FIG. 21, to thermal energy. In one example, substrate 810 is convectionally heated, and photo resist layer 806 is patterned to control the regions of photosensitive layer 800 that may expand.

In another example, the photosensitive layer is heated by conduction employing laser ablation/shaping. Specifically, a laser beam impinges upon areas of photosensitive layer 800 where lens are to be formed. The thermal energy from the laser beam causes the photosensitive layer 800 to bubble, forming arcuate regions 816 thereon, as shown in FIG. 22. In addition, the holographic transform function has been found to be effective in filtering electromagnetic energy outside of the optical spectrum, e.g., in the microwave region. Therefore, the scope of the invention should not be based upon the foregoing description. Rather, the scope of the invention should be determined based upon the claims recited herein, including the full scope of equivalents thereof.

What is claimed is:

1. A communication system comprising:
   a source of energy to propagate a signal along a communication path;

a detector positioned in the communication path; and a filter having a surface with a polarizing film disposed thereon and first and second holographic optical elements each of which has a holographic transform function disposed throughout the volume of the filter, the filter being disposed in the path to filter the signal in accordance with properties of the holographic transform function and the polarizing film to remove portions of the signal having unwanted characteristics, defining a transformed signal to impinge upon the detector, with the transform function associated with said first holographic optical element matching the transform function associated with said second holographic element.

2. The system as recited in claim 1 wherein the characteristics are selected from a group consisting essentially of amplitude, polarization, wavelength and phase.

3. The system as recited in claim 1 wherein the filter is a transmissive element, allowing the signal to propagate between opposing surfaces thereof.

4. The system as recited in claim 1 wherein the filter is a reflective element, allowing the signal to enter and exit the element through a common surface.

5. The system as recited in claim 1 wherein the signal is an optical signal.

6. The system as recited in claim 1 wherein the signal is an RF signal having a wavelength in the range of in the range of 1 micron to 1 millimeter, inclusive.

7. The system as recited in claim 1 wherein the source of energy includes an array of transmitters to generate a plurality of signals to propagate along a plurality of axes and the detector includes an array of receivers, each of which is positioned to sense one of the plurality of signals propagating along one of the plurality of axes and the filter includes an array of filters, each of which is disposed in one of the plurality of axes, with a subset of the filters of the array having the polarizing film disposed on a surface thereof and the holographic transform disposed in a volume of the filter.

8. The system as recited in claim 1 wherein the source of energy includes an array of transmitters to generate energy to propagate along a plurality of axes and the detector includes an array of receivers, each of which is positioned to sense energy propagating along one of the plurality of axes and the filter includes a plurality of filters each of which has a holographic transform function within a volume thereof, with the plurality of filters being arranged in first and second arrays, the first array being disposed between the array of transmitters and the array of receivers and the second array being disposed between the first array and the receivers.

9. The system as recited in claim 8 wherein the holographic transform function associated with a subgroup of the filters of the first array, defining a transfer function, differs from the holographic transform function associated with the remaining filters of the first array of filters, and the holographic transform function associated with a subset of the filters of the second array matches the transfer function.

10. The system as recited in claim 1 wherein the filter is an optical element has opposed sides with a spherical surface being positioned on one of the opposed sides and a planar surface being disposed on the remaining side of the opposed sides with the holographic transform function being disposed within a volume of the lens between the spherical and the planar surfaces.

11. The system as recited in claim 1 wherein the filter is an optical element has opposed sides with a cylindrical surface being positioned on one of the opposed sides and a planar surface being disposed on the remaining side of the opposed sides, with the holographic transform function being disposed within a volume of the lens between the cylindrical and the planar surfaces.

12. The system as recited in claim 1 wherein the filter is an optical element that has opposed sides with a spherical surface being positioned on one of the opposed sides and a rotary symmetric arrangement of grooves defining a Fresnel lens being disposed on the remaining side of the opposed sides with the holographic transform function being disposed within a volume of the lens between the spherical surface and the Fresnel lens.

13. The system as recited in claim 1 wherein the source of energy includes an array of optical transmitters to generate optical energy to propagate along a plurality of axes and the detector includes an array of optical receivers, each of which is positioned to sense optical energy propagating along one of the plurality of optical axes and the filter includes an array of lenses, each of which is disposed in one of the plurality of axes and includes the arcuate surface with the holographic transform being disposed within a volume of the array of lenses.

14. The system as recited in claim 1 wherein the source of optical energy includes an array of optical transmitters to generate optical energy to propagate along a plurality of axes and the detector includes an array of optical receivers, each of which is positioned to sense optical energy propagating along one of the plurality of optical axes and the filter including a plurality of lenses having the arcuate surface with holographic transform function being disposed within a volume thereof, with the plurality of lenses being arranged in first and second arrays, the first array being disposed between the array of optical transmitters and the array of optical receivers and the second array being disposed between the first array and the optical receivers.

15. A communication system comprising:

a source of optical energy to propagate a signal along an optical path;

an optical detector positioned in the communication path; and an optical filter having a surface with a polarizing film disposed thereon and first and second holographic optical elements each of which has a holographic transform function disposed throughout the volume of the optical filter, the optical filter being disposed in the optical path to filter the signal in accordance with properties of the holographic transform function and the polarizing film to remove portions of the signal having unwanted characteristics, defining a transformed signal to impinge upon the detector, with the transform function associated with said first holographic optical element matching the transform function associated with said second holographic element.

16. The system as recited in claim 15 wherein the source of optical energy includes an array of optical transmitters to generate optical energy to propagate along a plurality of axes and the detector includes an array of optical receivers, each of which is positioned to sense optical energy propagating along one of the plurality of optical axes and the optical system includes an array of lenses, each of which is disposed in one of the plurality of axes and includes the arcuate surface with the holographic transform being disposed within a volume of the array of lenses.

17. The system as recited in claim 16 wherein the source of optical energy includes an array of optical transmitters to generate optical energy to propagate along a plurality of axes and the detector includes an array of optical receivers, each of which is positioned to sense optical energy propagating along one of the plurality of optical axes and the optical system including a plurality of lenses having the arcuate surface with holographic transform function being disposed within a volume thereof, with the plurality of lenses being arranged in first and second arrays, the first array being disposed between the array of optical transmitters and the array of optical receivers and the second array being disposed between the first array and the optical receivers.

18. A communication system comprising:

an array of optical transmitters to generate optical energy to propagate along a plurality of axes;

an array of optical receivers, each of which is positioned to sense optical energy propagating along one of the plurality of optical axes;

a first array of refractory lenses, each of which is disposed in one of the plurality of axes and has a first polarizing film disposed thereon and a first holographic transform function recorded throughout a volume thereof to filter from the optical energy unwanted characteristics, with the first polarizing film and first holographic transform function associated with a subgroup of the lens of the first array, defining a transfer function, differing from first polarizing film and the first holographic transform function associated with the remaining lenses of the first array of lenses; and a second array of refractory lenses, each of which is disposed between the first array of lenses and the array of optical receivers to collect optical energy propagating along the one of the plurality of optical axes, with a subset of the lenses of the second array having a second polarizing film thereon and a second holographic transform function recorded in a second volume thereof, with the second polarizing film and the second holographic transform function matching the transfer function.

19. The system as recited in claim 18 wherein the lenses of the first and second arrays have a spherical surface and an additional surface disposed opposite to the spherical surface, with a Fresnel lens being disposed on the additional surface.

20. The system as recited in claim 18 wherein the lenses of the first and second arrays have a cylindrical surface and an additional surface disposed opposite to the cylindrical surface, with a Fresnel lens being disposed on the additional surface.

* * * * *